(12) United States Patent
Godleski

(10) Patent No.: US 8,267,592 B2
(45) Date of Patent: Sep. 18, 2012

(54) BEARING SUPPORT

(75) Inventor: Todd A. Godleski, Fishers, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1183 days.

(21) Appl. No.: 12/004,339

(22) Filed: Dec. 20, 2007

(65) Prior Publication Data

US 2008/0152483 A1 Jun. 26, 2008

Related U.S. Application Data

(60) Provisional application No. 60/876,774, filed on Dec. 22, 2006.

(51) Int. Cl.
*F16C 27/06* (2006.01)

(52) U.S. Cl. .......................... 384/558; 384/581; 384/585
(58) Field of Classification Search ................ 384/495, 384/535, 536, 558, 581, 585; 267/141.1–141.7
See application file for complete search history.

(56) References Cited

U.S. PATENT DOCUMENTS

| | | | | |
|---|---|---|---|---|
| 2,506,404 A * | 5/1950 | Morton et al. | ................ | 384/535 |
| 3,018,146 A * | 1/1962 | Euwe et al. | ................... | 384/299 |
| 3,829,184 A * | 8/1974 | Chevret | ....................... | 384/280 |
| 4,872,767 A * | 10/1989 | Knapp | ........................... | 384/99 |
| 5,033,875 A * | 7/1991 | Moulinet | ..................... | 384/536 |
| 6,224,533 B1 * | 5/2001 | Bengtsson et al. | .............. | 494/82 |
| 7,553,123 B2 * | 6/2009 | Casaro | ........................... | 415/90 |

* cited by examiner

*Primary Examiner* — William C Joyce
(74) *Attorney, Agent, or Firm* — Krieg DeVault LLP

(57) ABSTRACT

A compact bearing support operable for supporting and damping movement of a bearing assembly. The bearing support includes a plurality of flexible elements engaging the bearing assembly in a plurality of locations.

18 Claims, 4 Drawing Sheets

BEARING SUPPORT

CROSS REFERENCE

The present application claims the benefit of U.S. Patent Application No. 60/876,774, filed Dec. 22, 2006, which is incorporated herein by reference.

FIELD OF THE INVENTION

The present invention relates to an apparatus for supporting and dampening a bearing assembly.

BACKGROUND

High speed turbo-machines such as gas turbine engines require bearing assemblies to be supported in a manner that can hold them in place and dampen vibrations caused by imbalances in the rotating machinery. Typically a specialized damper such as a squeezed film fluid damper or other similar apparatus is required to be used in combination with complex support structure. The separate damper and support structure take up a relatively large amount of space and have weight penalties associated therewith. For machines that have design requirements to minimize size and weight, a need exists for a compact light weight bearing support that can also dampen vibrations without utilizing a separate damping apparatus.

SUMMARY

One aspect of the present invention provides for an apparatus including a roller bearing assembly having an inner race, an outer race, and a plurality of bearings; and a bearing support having a flange with a plurality of elongated flexible elements extending therefrom, the elements engageable with the bearing assembly.

In another aspect of the present invention, a bearing support includes at least one beam extending across a static portion of a bearing assembly in an axial direction, and a plurality of elongated flexible elements extending from opposing ends of the bearing support and engaging the bearing assembly.

In another aspect of the present invention, a method of supporting a bearing assembly comprising positioning a bearing support having a plurality flexible elements proximate to the bearing assembly; and engaging the plurality of elements with a static portion of the bearing assembly.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
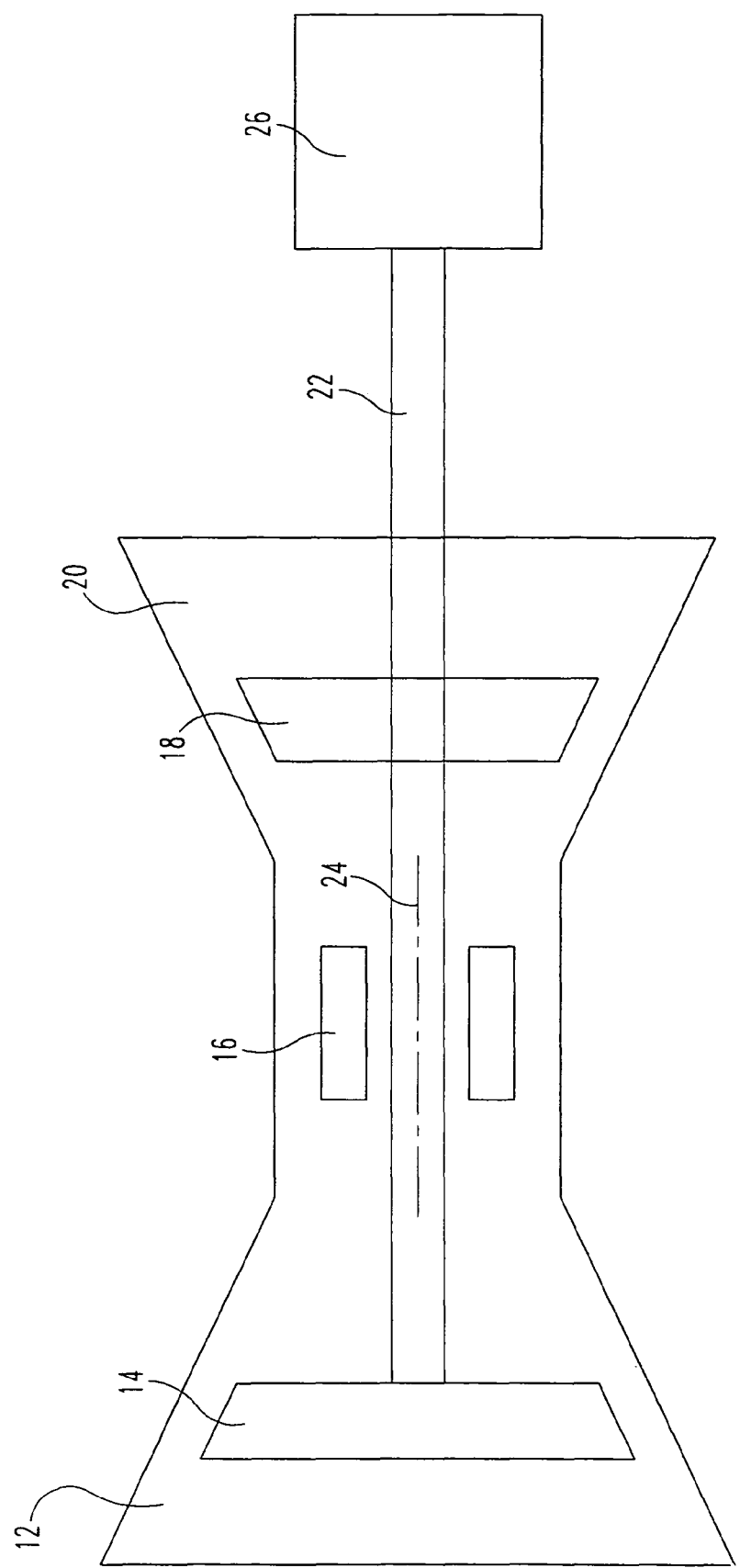
FIG. 1 is a schematic view of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

High speed machines have shafts that drive turbo-machinery, gears, power takeoff systems (PTO) and the like. Rotating components often require bearings to support and minimize rotational friction. Regardless of design and manufacturing skill there are imbalances in systems having rotating components due to manufacturing tolerance stackups and the like. These imbalances generate vibrations in rotating systems that are harmful and can lead to high cycle fatigue of effected components if the vibrations are not dampened out appropriately. Damping is also required when the machine is on a movable platform that generates forces and component movement due to maneuver loads such as those generated on an aircraft. Typically a damping device is associated with one or more bearing assemblies in high speed machines such as gas turbine engines. Bearing assemblies can be of any type known to those skilled in the art, but typically include roller bearings and ball bearings. Squeeze film dampers and other types known to those skilled in the art are often used in conjunction with a bearing assembly support structure. A compact bearing support designed to dampen vibrations without a separate damper is described below. It should be understood that while a gas turbine engine utilizing the bearing support is illustrated, that other high speed machines will advantageously benefit from the teachings herein.

Referring to FIG. 1, a schematic view of a gas turbine engine 10 is depicted. While the gas turbine engine is illustrated with one spool (i.e. one shaft connecting a turbine and a compressor), it should be understood that the present invention is not limited to any particular engine design or configuration and as such may be used in multi spool engines of the aero or power generation type. The gas turbine engine 10 will be described generally, however significant details regarding general gas turbine engines will not be presented herein as it is believed that the theory of operation and general parameters of gas turbine engines are well known to those of ordinary skill in the art.

The gas turbine engine 10 includes an inlet section 12, a compressor section 14, a combustor section 16, a turbine section 18, and an exhaust section 20. In operation, air is drawn in through the inlet 12 and compressed to a high pressure relative to ambient pressure in the compressor section 14. The air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 22. The shaft 22 rotates about a centerline axis 24 that extends axially along the longitudinal axis of the engine 10, such that as the turbine section 18 rotates due to the forces generated by the high pressure working fluid, the compressor section 14 is rotatingly driven by the turbine section 18 to produce compressed air. A portion of the power extracted from the turbine section 18 can be utilized to drive a secondary device 26, such as an electrical, gas compressor or pump and the like. Alternatively, the gas turbine engine 10 can be of the aero type to produce thrust or shaft power for fixed wing aircraft or rotorcraft, respectively. Thrust producing engines produce high velocity mass flow through the exhaust section 20 and do not drive a secondary device 26.

Figure 2:
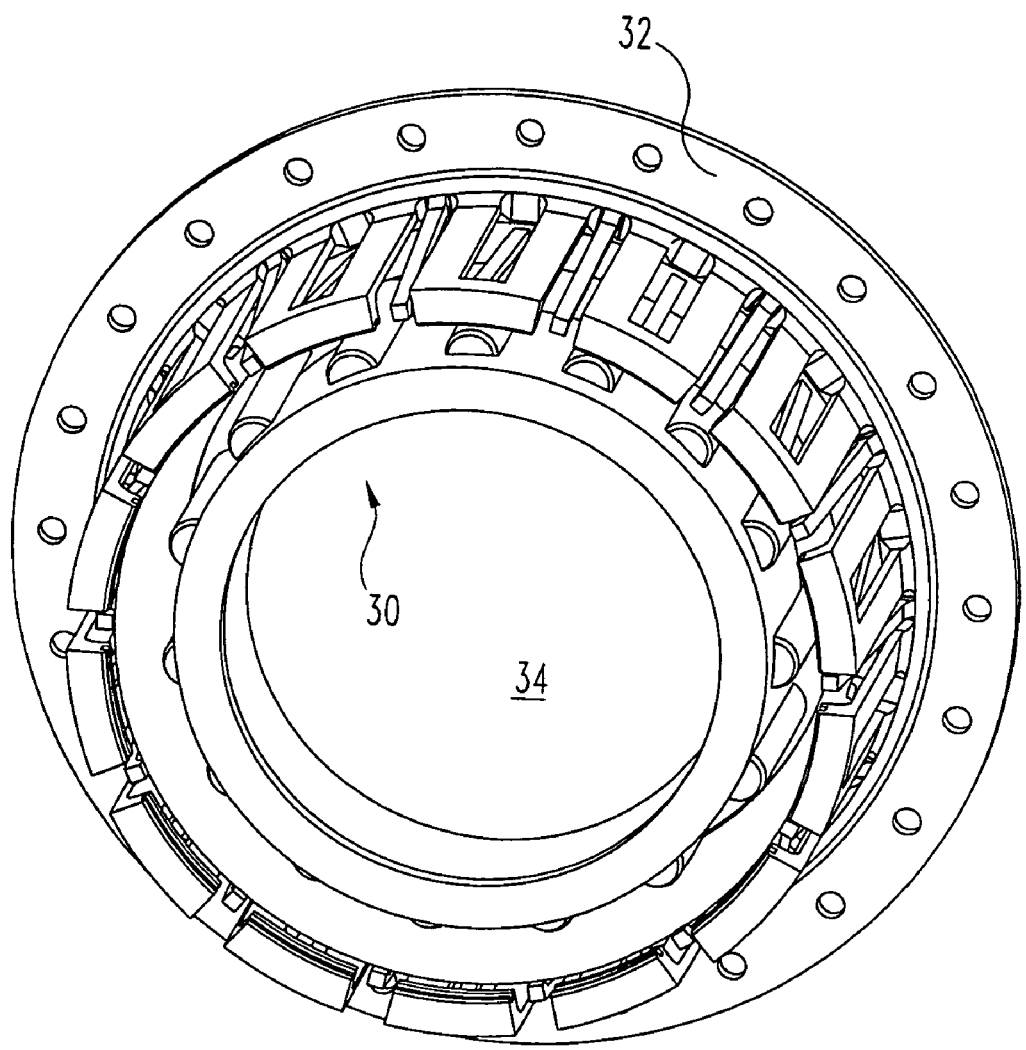
FIG. 2 is a perspective view of a bearing support engaged with a bearing assembly.

Referring now to FIG. 2, a bearing assembly 30 is housed within a bearing support 32. A shaft operable for rotation is not shown, but would extend though the inner opening 34 of the bearing assembly. The bearing support 32 is static and holds the bearing assembly 30 in position.

Figure 3:
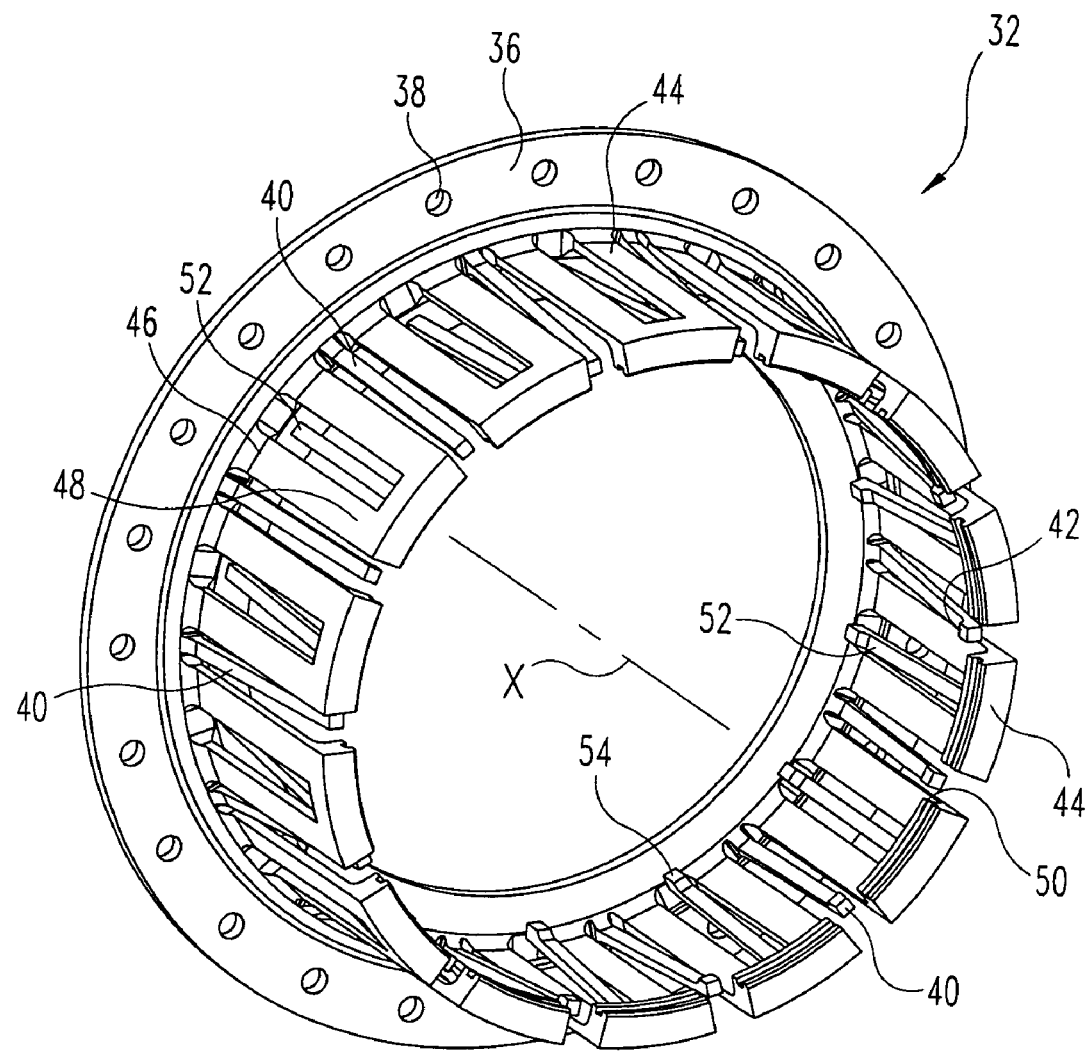
FIG. 3 is perspective view of the bearing support of FIG. 2 with the bearing assembly removed.

Referring to FIG. 3, one form of the bearing support 32 is shown with the bearing assembly 30 removed for clarity. The bearing support 32 can include a flange 36 for connecting with static structure (not shown) in the engine 10. The flange 36 can have a plurality of through apertures 38 for fasteners (also not shown) to pass through and engage static structure (not shown) of the engine 10.

A plurality of elongated elements 40 extend from the flange substantially parallel to an axis X of rotation. In one embodiment, the elements 40 can terminate with a radially inward protruding face 42. Each face 42 of the elements 40 engage with static portions of the bearing assembly 32 (not shown in FIG. 3). The elements 40 not only provide structural support for the bearing assembly 32, but also provide damping for the rotating system. The elements 40 can be tuned for a desired application by selecting mechanical properties of the design. Stiffness and damping characteristics of the elements 40 can be tuned by features which include, but are not limited by cross sectional size and shape, length, and material selection as one skilled in the art would readily understand. It should be noted that each element 40 can have discreet stiffness and damping properties which may differ from element to element.

A plurality of relative stiff beams 44 can be positioned intermittently between the elements 40. While the beams 44 are illustrated as being symmetrically positioned between the elements 40, the present invention contemplates asymmetric positioning as well. As each bearing support 32 is tuned for a particular application there are an unlimited number of variations that could occur. The beams 44 extend from the flange 36 substantially parallel to the elements 40 in a circumferential pattern. Each beam 44 has an end 46 attached proximate to the flange 36 and an opposing end 48 distal from the flange 36. In one embodiment, the end 46 of the beam 44 has at least two connection points proximate the flange 36 forming a substantially U-shaped structure. The distal end 48 of the beam 44 can include a groove 50 formed therein for receiving a retaining ring (not shown in FIG. 3) or the like. At least one element 52 extends from the second end 48 of each beam 44. The elements 52 extending from the beam 44 can be substantially similar to the elements 40 extending from the flange 36 except for the opposing direction of extension. The elements 52 can also have a face 54 for engaging static structure of the bearing assembly (not shown in FIG. 3). As disclosed above with respect to the elements 40, the elements 52 are tuned by design of the length, width, height, cross sectional shape, and material selection. Furthermore while not shown in the drawings, each element 52 can be attached at more than one location to the beam 44 because the beam 44 extends across the bearing assembly 32. Alternate embodiments of the beam 44 can include only one connection point or more than two connections proximate the flange 36.

Figure 4:
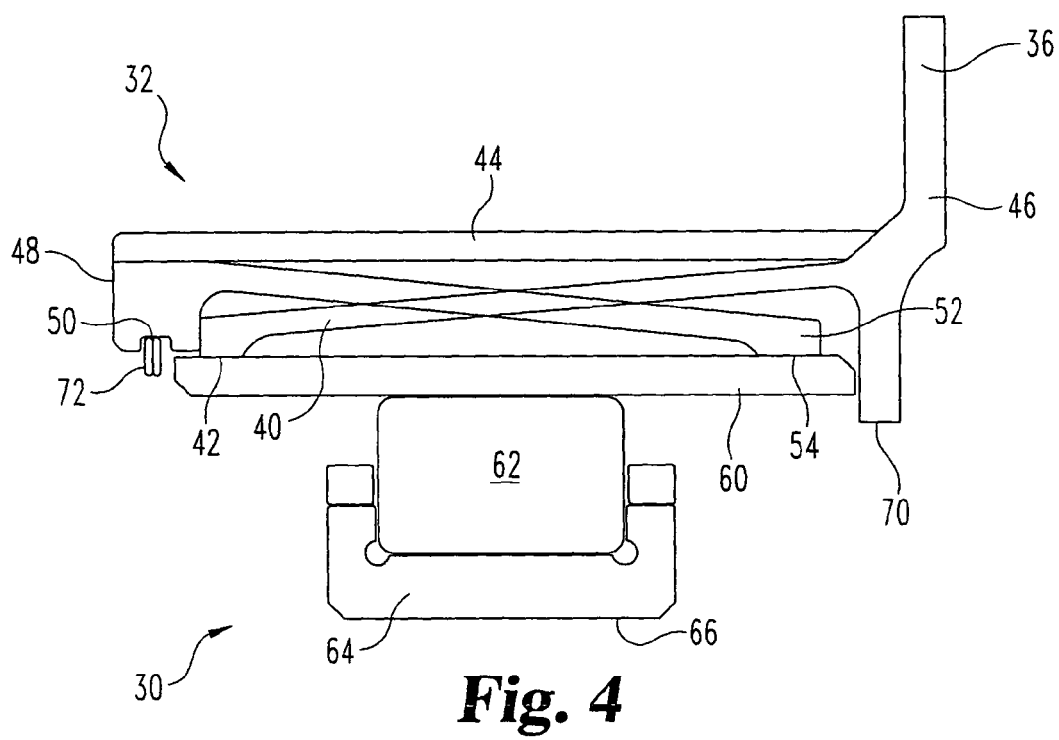
FIG. 4 is sectional view of FIG. 2 partially rotated out of plane, showing the bearing support engaged with the bearing assembly.

Referring to FIG. 4, the bearing assembly 30 and bearing support 32 is shown in cross section. It should be understood that at least a portion of the view is rotated out of plane for visual clarity, therefore FIG. 4 is not a true cross sectional drawing. The bearing assembly 30 includes an outer race 60 that is radially supported with the elements 40 and 52. The outer race 60 is free to move radially as the elements 40, 52 flex under load. The faces 42, 54 of the elements 40, 52 respectively, engage with the outer race 60. The flexible elements 40, 52 permit the outer race 60 to move radially inward and outward as the faces 42, 54 remain in contact therewith. Each end 46, 48 of the outer race 60 can move radially inward and outward proportionally or unevenly such that one end is positioned at a different radial location than the other end.

A set of roller bearings 62 is positioned between the outer race 60 and an inner race 64. A shaft (not shown) is engaged an inner surface 66 of the inner race 64. The inner race 64 and bearings 62 are free to rotate with respect to the outer race 60 when the shaft rotates. A pair of axial stops 70, 72 limit axial travel of the outer race 60 of the bearing assembly 30. The stop 70 can extend radially inward proximate the end 46 past the outer race 60. The stop 72 can be a removable retaining ring such a c-ring or the like. The retaining ring 72 can be positioned within the groove 50 adjacent the end 48 of the bearing support 30. The retaining ring 72 extends radially inward past at least a portion of the outer race 60 at the end 48. In this manner the outer race 60 is axially trapped between the two stops 70, 72. The outer race 60 can be installed and removed by removing the retaining ring 72 from the groove 50.

The bearing support 32 can be formed by machining the elements 40 and 52, beams 44, flange 36, and other features from one block of material. Alternatively, the features of the bearing support 32 can be formed separately and attached via mechanical connection such as welding, brazing, gluing, epoxy, mechanical fasteners, and the like. Material selection is dependent on the operating conditions of the machine 10 and the magnitude of strength and damping requirements of the bearing support 32. The bearing support 32 can be formed from one material or alternatively multiple materials. The material can include common high carbon metals such as iron and steel, high strength super alloys, plastics, composites and ceramics.

In operation, the elements 40, 52 of the bearing support 32 can provide structural support and damping for a bearing assembly 30. Each element 40, 52 can bend or flex radially inward or outward as loads on the bearing assembly 30 causes both high cycle movement under vibration loads as well as displacement caused by maneuver loads and the like. The bearing support 32 will permit the bearing assembly to move symmetrically inward or outward in a radial direction as well as asymmetrically where one end moves in a first direction and the other end moves in an opposite direction.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
   a roller bearing assembly having an inner race, an outer race, and a plurality of bearings;
   a bearing support having a flange with a plurality of first elongated flexible elements extending away from the flange, the bearing support also including a second elongated flexible element extending toward the flange, the first and second elements engageable with the bearing assembly;
   at least one beam extending from the flange substantially across the bearing assembly in an axial direction; and
   wherein the beam is substantially U-shaped and is connected proximate the flange in more than one location.

2. The apparatus of claim 1, wherein the second elongated flexible element extends from the beam from the opposite side of the flange.

3. The apparatus of claim 1, wherein the bearing support limits axial movement of the bearing assembly.

4. The apparatus of claim 1, further comprising:
   a retaining clip for restraining movement of the bearing assembly away from the flange.

5. The apparatus of claim 4, wherein the retaining clip is a C-ring positioned within a circumferential groove formed in the bearing support.

6. The apparatus of claim 1, wherein the first flexible elements are tuned to dampen movement of the roller bearing assembly over a range of operating speeds.

7. The apparatus of claim 1, wherein the bearing support is formed from a single block of material.

8. The apparatus of claim 1, wherein the bearing support is made from at least one of metal, plastic, or composite material.

9. The apparatus of claim 1, wherein the first and second flexible elements engage the bearing assembly in a plurality of discreet axial locations between a first end and an opposing second end.

10. The apparatus of claim 1, wherein each of the first and second flexible element has a discrete stiffness and damping property.

11. The apparatus of aim 1, wherein the bearing support is operable in a gas turbine engine.

12. A bearing support comprising:
    at least one bear having a proximal end and a distal end and extending across a static portion of a bearing assembly in an axial direction; and
    a plurality of elements having fixed first ends and moveable second ends for engaging the bearing assembly, a first set of the plurality of elements extending from a first end of the bearing support, a second set of the plurality of elements extending from a second end of the bearing support opposite the first end of the bearing support, the moveable second ends of the first set structured to engage the bearing assembly adjacent the proximal end of the beam and the moveable second ends of the second set structured to engage the bearing assembly adjacent the distal end of the beam;
    wherein the beam is substantially U-shaped.

13. The bearing support of claim 12, further comprising:
    stops at either end of the bearing support to limit axial movement of the bearing assembly.

14. The bearing support of claim 13, wherein at least one stop includes a retaining ring engaged with the bearing support.

15. The bearing support of claim 12, wherein the bearing assembly is a roller bearing assembly, and wherein the elements are tuned to dampen movement of the roller bearing assembly over a range of operating speeds.

16. The bearing support of claim 12, wherein the elements engage the bearing assembly in a plurality of discreet axial locations between a first end and an opposing second end.

17. The bearing support of claim 12, wherein each element is tuned with a discrete stiffness and damping characteristic property.

18. The bearing support of claim 12, wherein the bearing support operates in a gas turbine engine.

\* \* \* \* \*